May 19, 1931. J. G. BERGDOLL 1,805,901
REFRIGERATION
Filed Nov. 19, 1929 2 Sheets-Sheet 1
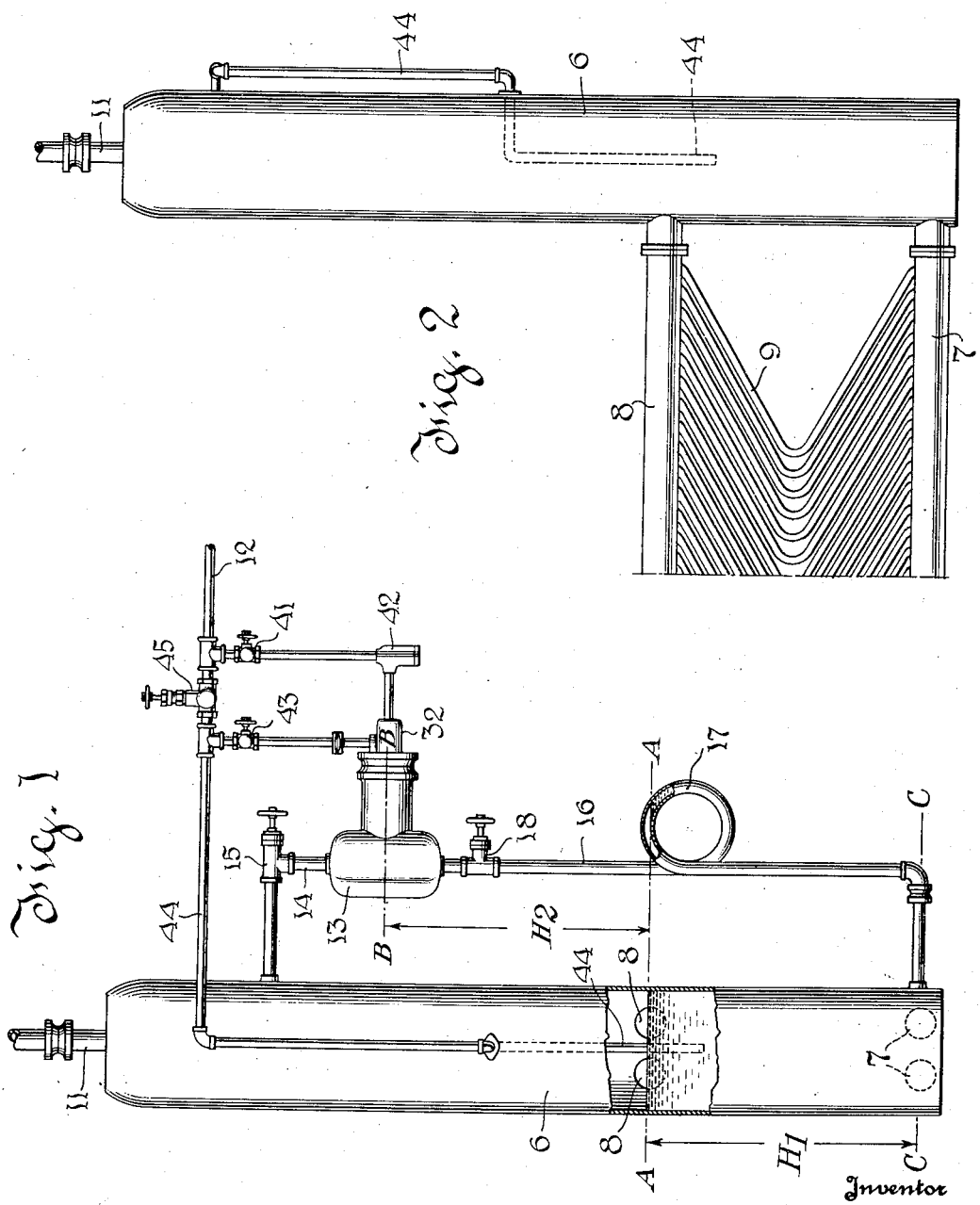

May 19, 1931. J. G. BERGDOLL 1,805,901
REFRIGERATION
Filed Nov. 19, 1929 2 Sheets-Sheet 2
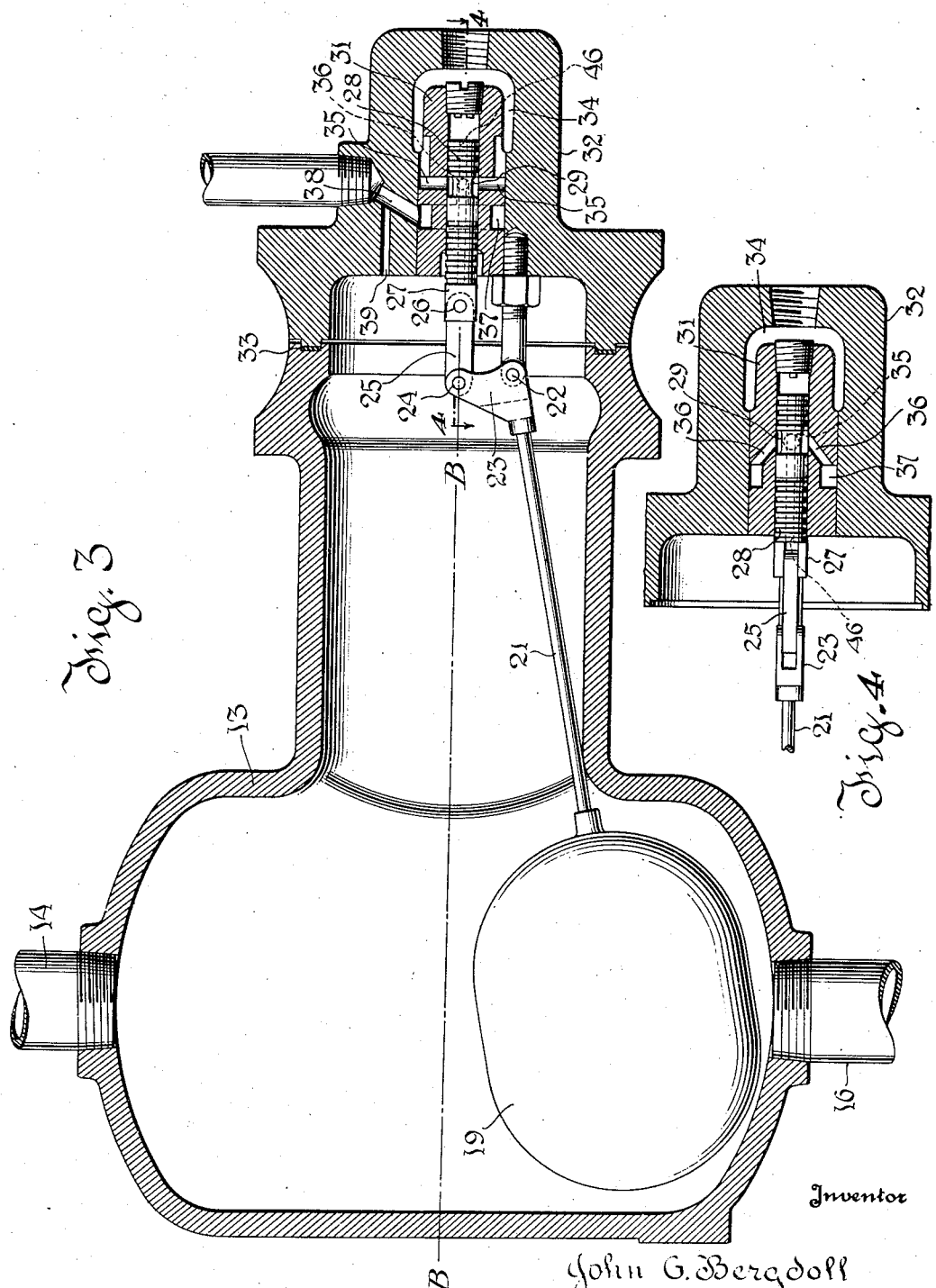
Inventor
John G. Bergdoll
By Dodge and Sons
Attorneys Patented May 19, 1931

1,805,901

UNITED STATES PATENT OFFICE

JOHN G. BERGDOLL, OF YORK, PENNSYLVANIA, ASSIGNOR TO YORK ICE MACHINERY CORPORATION, OF YORK, PENNSYLVANIA, A CORPORATION OF DELAWARE

REFRIGERATION

Application filed November 19, 1929. Serial No. 408,363.

This invention relates to refrigeration, and particularly to means for controlling the feed of liquid refrigerant to flooded evaporators.

The usual control involves a float valve, located at the level which it is desired to maintain in the evaporator. As such evaporators are in many cases submerged in brine tanks, the float valves are commonly not readily accessible for inspection and repair.

The present invention overcomes this maintenance difficulty, by providing an arrangement in which the valve and float may be located above the liquid level in the evaporator.

Generally stated, the float responds to the rise and fall of a column of liquid (preferably refrigerant), which balances a liquid column in the evaporator, the two columns being connected by a pressure transmitting link of refrigerant vapor.

A preferred embodiment of the invention is illustrated in the accompanying drawings, in which, Fig. 1 is an end elevation of an evaporator with the invention applied.

Fig. 2 is a fragmentary side elevation of the same.

Fig. 3 is an enlarged vertical section through the float valve.

Fig. 4 is a section on the line 4—4 of Fig. 3.

An evaporator of the type described and claimed in the patent to Shipley, No. 1,718,313, is illustrated, but any flooded evaporator or similar closed volume in which a definite level of liquid refrigerant is to be maintained might be substituted.

The vertical drum 6 serves as a receiver suction trap. The lower or liquid headers of the evaporator appear at 7, and the upper or gas headers at 8. These are substantially horizontal and are connected by V-shaped riser tubes 9. The liquid level in the evaporator is indicated by the line A—A, and is approximately at the centers of the upper headers 8.

Connected at the upper end of the drum 6 is the suction line 11, which leads to the compressor, not shown.

The liquid supply line 12 is connected to deliver liquid to the drum 6 either through a float controlled valve (normal operation) or through an expansion valve, but before describing the connections, the construction and arrangement of the float controlled valve will be explained.

The float valve mechanism includes a float chamber housing 13. From the top of this there leads a pressure equalizing connection 14 to the interior of drum 6 above the liquid level A—A. This connection is controlled by a normally open stop-valve 15. From the bottom of float chamber housing 13 a pipe 16 leads to the interior of the drum 6 below the liquid level A—A, and preferably near the bottom of the drum. A liquid seal trap 17 is interposed in pipe 16 and in practice this is conveniently formed as a simple loop. A normally open stop valve 18 is interposed in pipe 16.

The level of the liquid seal in trap 17 is here shown as coincident with the line A—A, i. e., the level of liquid to be maintained in the evaporator. The float valve mechanism is arranged, as hereinafter described, to maintain a level B—B in the chamber 13 so that the pipe 16 down to the level A—A, at which the trap 17 functions, is filled with liquid refrigerant. Below the level A—A and down to the level C—C, which marks the upper limit of the connection between pipe 16 and drum 6, the pipe 16 is filled with refrigerant vapor.

This follows from the fact that vapor evolved from liquid refrigerant in pipe 16 below trap 17 is prevented from flowing upward by this trap. Hence it displaces liquid downward and into the drum 6, until the pipe is free of liquid.

This vapor serves as a substantially weightless pressure medium interposed between a liquid column $H_1$ in drum 6 and the liquid column $H_2$ in pipe 16 and chamber 13. In the illustrated embodiment both columns are of liquid refrigerant, so $H_1=H_2$.

Referring now particularly to Figs. 3 and 4, it will be observed that in the chamber 13 there is a float 19 which is carried on a rod 21. The rod 21 is pivoted at 22 on a bracket provided for that purpose and carries an offset arm or lug 23 which is pivoted at 24 to a link 25. The link 25 is pivoted at 26 to a balanced piston slide valve 27. This valve has the usual sealing grooves 28 and a port groove 29. It slides in a cylindrical seat bushing 31 which is pressed into the housing member 32, which in turn is bolted to the housing 13 forming the float chamber. A gasket 33 affords a tight seal.

The liquid refrigerant is supplied to a chamber 34 by connections hereinafter described, and thence flows to two opposed seat ports 35 in the bushing 31. When the valve 27 is carried to the left by the descent of the float 19 (see Fig. 3), the groove port 29 connects the two ports 35 with a pair of opposed ports 36 (see Fig. 4) which are spaced at 90° to the ports 35 and lead obliquely to a discharge channel 37. The channel 37 communicates by a passage 38 with a discharge connection. A branch passage 39 of small dimension bleeds off a limited portion of liquid from the passage 38 and delivers it to the float chamber 13.

When the liquid level in the chamber 13 rises to the level B—B the resulting rise of the float 19 will move the valve 27 far enough to the right to carry the groove 29 out of register with the ports 35 and 36, thus cutting off the flow of liquid refrigerant. The liquid line 12 is connected through a stop valve 41 and a strainer 42 with the supply chamber 34. The discharge passage 38 is connected by way of stop valve 43 and pipe 44 to the interior of the drum 6, the pipe 44 discharging below the liquid level A—A, as clearly shown in the drawings.

The valves 41, 43, 15 and 18 are normally open, but in the event that it is desired to put the float control out of action and regulate the supply of liquid refrigerant by a hand operated expansion valve, the valves 41, 43, 15 and 18 are closed and the flow is regulated by an expansion valve 45 which offers a by-pass between the pipes 12 and 44. This feature is illustrated merely to explain the possibility of making such connection. Normally the valve 45 is closed and the feed is controlled by the float valve mechanism.

The port 39 has an important function. The float chamber 13 is connected with the vapor space in drum 6 by the pressure equalizing pressure connection 14, and some refrigerant evaporates from the chamber 13. Under sustained load conditions valve 27 seldom closes completely, so that a small quantity of refrigerant is fed continuously or at frequent intervals by way of the passage 39 to the float chamber. The passage 39 is so dimensioned that the quantity of liquid so fed is at least equal to the maximum evaporative loss from the chamber 13. Any excess causes a slow flow of liquid refrigerant down the pipe 16 and through the trap 17. This flow should be so limited as to avoid any tendency to flood the gas-filled portion of the pipe 16 below the trap 17.

The valve 27 has been described as balanced. It is balanced against lateral pressure by the opposed arrangement of the ports 35 and by the opposed arrangement of the ports 36. It is balanced against longitudinal pressures by means of a small port 46 which is bored longitudinally through the valve and which is shown in dotted lines in Figs. 3 and 4.

While it is convenient to arrange the parts so that the level A—A in the drum 6 coincides with the sealing level of the trap 17, this arrangement is not vitally essential and may be departed from. The important thing is that the liquid column $H_2$ shall balance the liquid column $H_1$. It is far simpler to use refrigerant liquid for both columns, but it is within the range of possibility to use a different liquid for the column $H_2$. In such case the columns would balance each other but would not necessarily be of the same height, this being controlled by their relative specific gravities.

The operation of the device will be clear from the description already given.

In certain of the claims the portion of pipe 16, above the sealing level of trap 17, together with the liquid filled portion of chamber 13, are referred to as a "liquid containing manometer" for, in effect the column $H_2$ is merely a manometer column.

What is claimed is,—

1. The combination with an evaporator, of means for maintaining a substantially constant liquid level therein, comprising a liquid containing manometer; a valve controlling the supply of liquid refrigerant to the evaporator; operating means for said valve responsive to the height of the liquid in said manometer; a pressure transmitting connection between said manometer and a point within the evaporator below the liquid level therein; and means for developing in said connection a vapor pressure at least equal to the head of the liquid refrigerant at said point.

2. The combination with an evaporator, of means for maintaining a substantially constant liquid level therein, comprising a liquid containing manometer; a valve controlling the supply of liquid refrigerant to the evaporator; operating means for said valve responsive to the height of the liquid in said manometer; a pressure equalizing connection between the upper end of the manometer and the vapor space above the liquid in the evaporator; a pressure transmitting connection between said manometer and a point within the evaporator below the liquid level therein; and means for developing in said connection a vapor pressure at least equal to the head of the liquid refrigerant at said point.

3. The combination with an evaporator, of means for maintaining a substantially constant liquid level therein, comprising a manometer containing a column of liquid refrigerant; a valve controlling the supply of liquid refrigerant to the evaporator; operating means for said valve responsive to the height of the liquid column in said manometer; a pressure transmitting connection between said manometer and a point within the evaporator below the liquid level therein; and means for developing in said connection a refrigerant vapor pressure at least equal to the head of the liquid refrigerant at said point.

4. The combination with an evaporator, of means for maintaining a substantially constant liquid level therein, comprising a manometer containing a column of liquid refrigerant; a valve controlling the supply of liquid refrigerant to the evaporator; operating means for said valve responsive to the height of the liquid column in said manometer; a pressure equalizing connection between the upper end of the manometer and the vapor space above the liquid in the evaporator; a pressure transmitting connection between said manometer and a point within the evaporator below the liquid level therein; and means for developing in said connection a refrigerant vapor pressure at least equal to the head of the liquid refrigerant at said point.

5. The combination with an evaporator, of means for maintaining a substantially constant liquid level therein, comprising a manometer containing a column of liquid refrigerant; a valve controlling the supply of liquid refrigerant to the evaporator; operating means for said valve responsive to the height of the liquid column in said manometer; a pressure equalizing connection between the upper end of the manometer and the vapor space above the liquid in the evaporator; a pressure transmitting connection between said manometer and a point within the evaporator below the liquid level therein; means for developing in said connection a refrigerant vapor pressure at least equal to the head of the liquid refrigerant at said point; and means for supplying liquid refrigerant to said manometer column at a restricted rate.

6. The combination with an evaporator, of means for maintaining a substantially constant liquid level therein comprising a valve controlling the supply of liquid refrigerant to the evaporator; a float chamber and a liquid sealed trap arranged to define a manometer column; a pressure equalizing connection from the float chamber to the vapor space of the evaporator; a pressure transmitting connection between the trap and a point within the evaporator below the liquid level therein; and a float in said float chamber connected to close said valve upon a rise of liquid level in said chamber.

7. The combination with an evaporator, of means for maintaining a substantially constant liquid level therein comprising a valve controlling the supply of liquid refrigerant to the evaporator; a float chamber and a liquid sealed trap arranged to define a manometer column; a pressure equalizing connection from the float chamber to the vapor space of the evaporator; a pressure transmitting connection between the trap and a point within the evaporator below the liquid level therein; a float in said float chamber connected to close said valve upon a rise of liquid level in said chamber; and means for feeding liquid refrigerant at a restricted rate to said chamber.

8. The combination with an evaporator, of means for maintaining a substantially constant liquid level therein, comprising a valve controlling the supply of liquid refrigerant to the evaporator; a float chamber and a liquid sealed trap arranged to define a manometer column; a pressure equalizing connection from the float chamber to the vapor space of the evaporator; a pressure transmitting connection between the trap and a point within the evaporator below the liquid level therein; a float in said float chamber connected to close said valve upon a rise of liquid level in said chamber; and means controlled by said valve for feeding liquid refrigerant at a restricted rate to said chamber.

In testimony whereof I have signed my name to this specification.

JOHN G. BERGDOLL.